June 21, 1938. L. D. SOUBIER 2,121,491
MACHINE FOR DECORATING SURFACES BY STENCIL METHOD
Filed Feb. 14, 1934 4 Sheets-Sheet 1

Inventor
Leonard D. Soubier
By J. F. Rule,
Attorney

June 21, 1938.  L. D. SOUBIER  2,121,491
MACHINE FOR DECORATING SURFACES BY STENCIL METHOD
Filed Feb. 14, 1934  4 Sheets-Sheet 3

Inventor
Leonard D. Soubier
By J. F. Rule,
Attorney

June 21, 1938.  L. D. SOUBIER  2,121,491
MACHINE FOR DECORATING SURFACES BY STENCIL METHOD
Filed Feb. 14, 1934  4 Sheets-Sheet 4
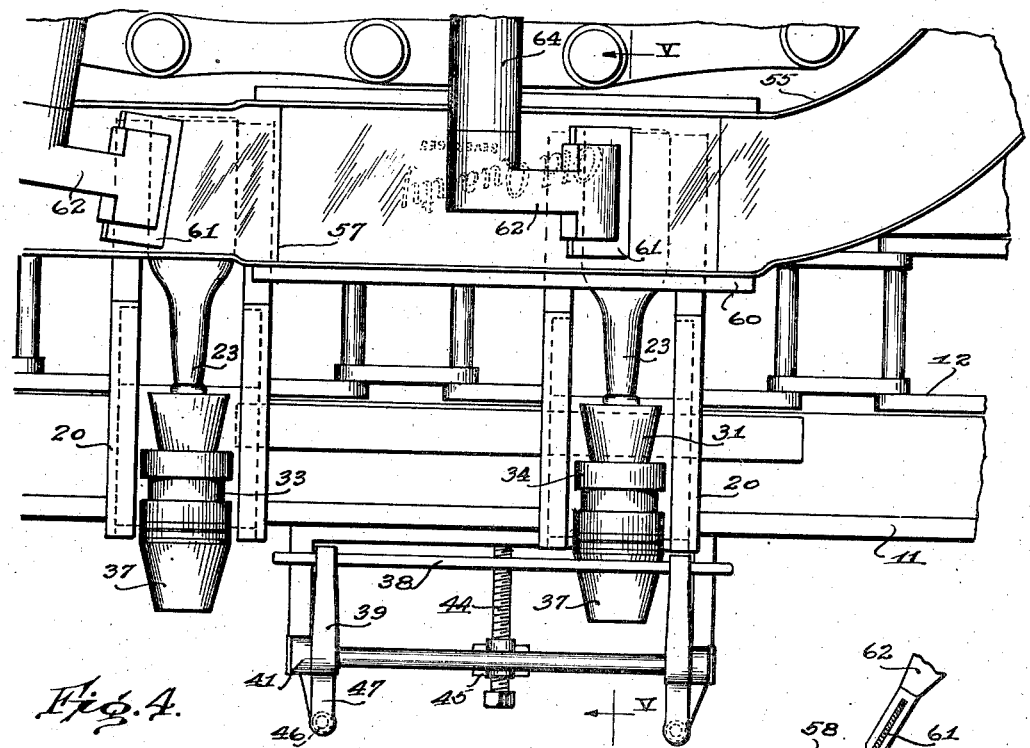
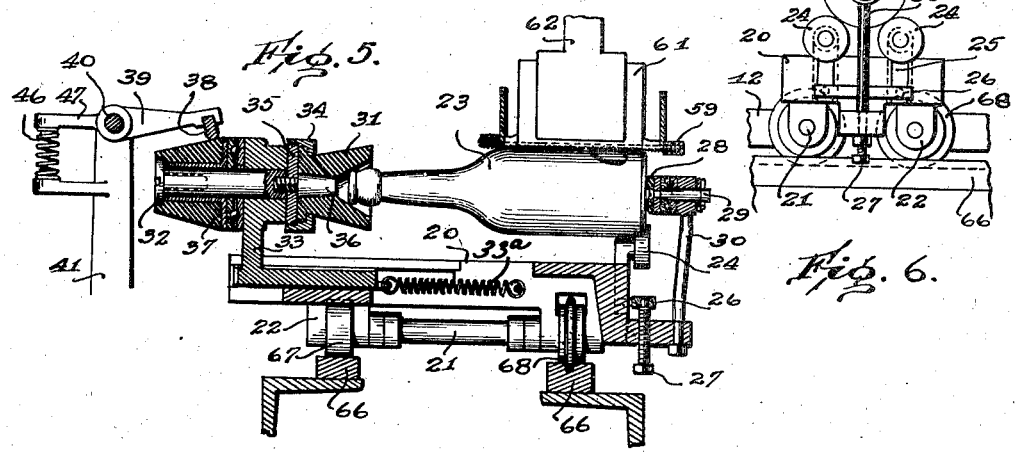
Inventor
Leonard D. Soubier
By J. F. Rule
Attorney Patented June 21, 1938

2,121,491

UNITED STATES PATENT OFFICE 2,121,491

MACHINE FOR DECORATING SURFACES BY STENCIL METHOD

Leonard D. Soubier, Toledo, Ohio, assignor to Owens-Illinois Glass Company, a corporation of Ohio Application February 14, 1934, Serial No. 711,135

25 Claims. (Cl. 101—123)

The present invention relates to a machine for decorating or marking cylindrical surfaces of articles with lettering or other desired designs, by a screen process in which the ink or coloring material is applied and forced through a screen by means of a squeegee. In the form of the invention herein illustrated, the machine is designed for decorating the surfaces of round bottles or other articles of similar shape.

An object of the invention is to provide a machine which operates automatically to decorate bottles or the like which are fed in continuous succession through the machine as by means of an endless conveyor. A further object of the invention is to provide simple and practical apparatus for adjusting the article holding mechanism to adapt it to articles of different lengths and different diameters.

The invention further provides means for rotating the article as it travels in rolling contact with the screen during the decorating process, and means for adjusting the speed of such rotation to correspond with the diameter of the article and thereby to synchronize its surface speed of rotation with its speed of advancement relative to the screen.

A further object of the invention is to provide a novel and practical means for continuously driving a series of squeegees in an endless path, and to synchronize their movements with those of the articles as the latter roll in contact with the screen.

Other objects of the invention will appear hereinafter.

Referring to the accompanying drawings.

Figure 2:
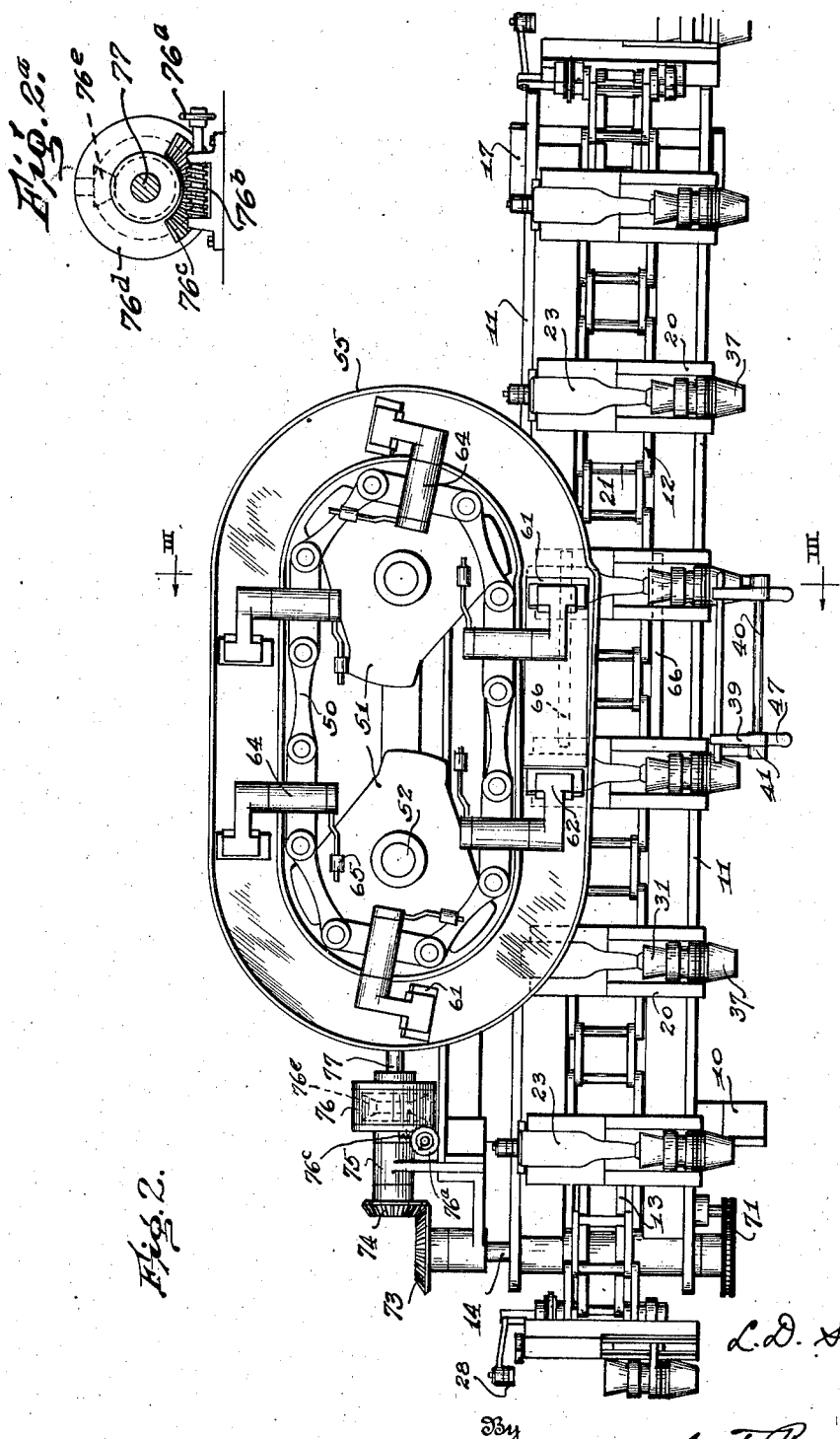
Fig. 2 is a plan view of the same.

Fig. 2—A is a detail view of means for adjusting the position of the squeegee carrier relative to the conveyor therebeneath.

Figure 3:
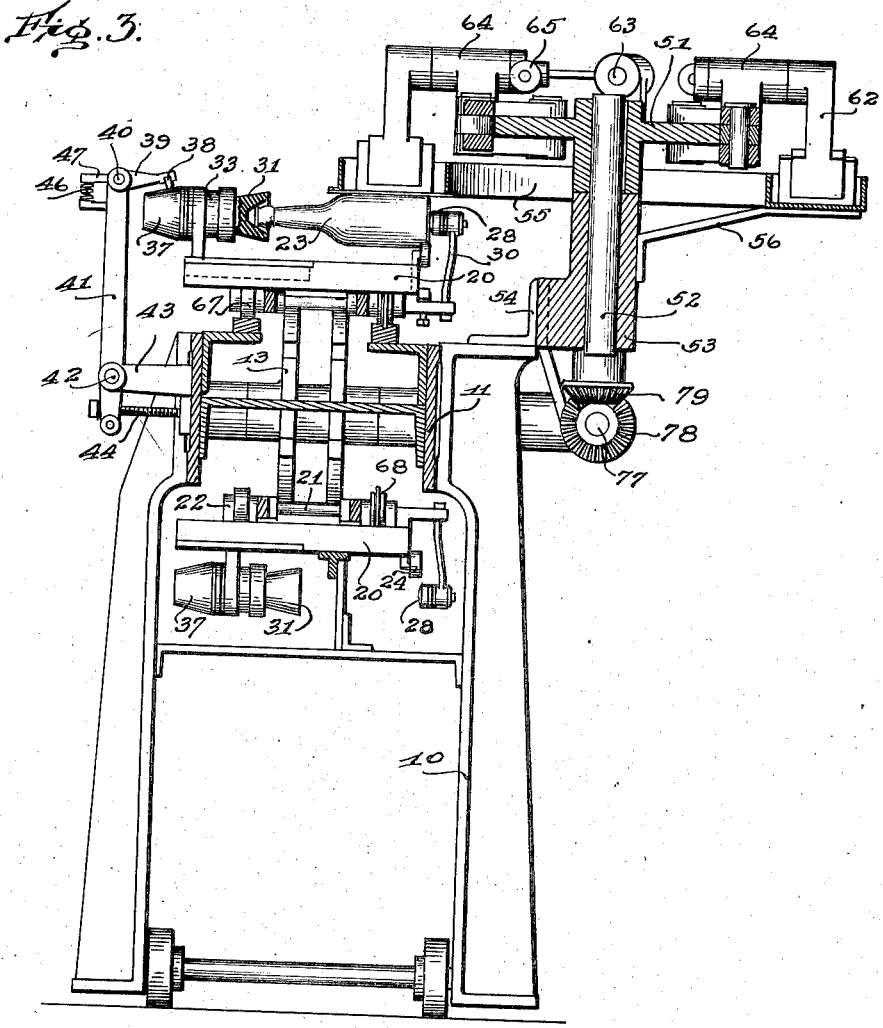

Fig. 3 is a sectional elevation at the line III—III on Fig. 2.

Fig. 4 is a fragmentary top plan view showing the screen frame and adjacent portions of the mechanism.

Fig. 5 is a sectional elevation showing particularly the article holding mechanism, the section being taken at the line V—V on Fig. 4.

Fig. 6 is a fragmentary end elevation of mechanism shown in Fig. 5.

The machine is mounted on a frame comprising standards 10 to the upper ends of which are secured frame members 11 extending lengthwise of the frame and providing supports for an endless chain conveyor 12. The conveyor runs over driving sprocket wheels 13 mounted on a shaft 14 journaled in the frame members 11 adjacent one end thereof and similar sprocket wheels carried on a shaft 15 at the opposite end of the frame. The shaft 15 is journaled in bearing blocks 16 adjustable in guides 17 by means of adjusting screws 18 for taking up slack and regulating the tension of the conveyor.

Article holding devices are arranged at equal intervals along the conveyor, each said device comprising a supporting frame or carrier 20 extending transversely of the conveyor and connected to adjoining links of the conveyor chain by pivot shafts 21 (Figs. 5 and 6) journaled in lugs 22 on the frame 20. The article to be decorated, here shown as a bottle 23, is supported at one end by rolls 24 carried on a vertically adjustable support including arms 25 and a cross piece 26, said support being adjustable up and down on the carrier 20. Adjustment is effected by means of an adjusting screw 27. An end support for the bottle 23 comprises a disk or roll 28 which may have a rubber facing adapted to engage the end of the bottle centrally thereof, said disk being mounted to rotate on a pivot pin 29 carried on an upright arm 30 attached to the carrier frame 20.

The neck end of the bottle is supported in a chuck or head 31 which may consist of rubber, rubber composition or other suitable material. The chuck is removably attached to a spindle 32 journaled in a slide frame 33, the latter being mounted to slide on the carrier frame 20. The chuck may be removably attached to the spindle by means of a collar 34 having a screw threaded connection with a disk 35, the latter clamped to the spindle by means of a screw threaded shank on a centering pin 36 on which the head 31 is carried.

Means for imparting rotation to the chuck includes a frusto-conical head 37 which may be made of rubber composition or the like, fixed to the spindle to rotate therewith. During the travel of the carrier 20 through the stenciling zone the head 37 runs beneath and in contact with a stationary bar 38 which frictionally engages said head and thereby imparts rotation to the chuck. The bar 38 is carried on a pair of rock arms 39 mounted on a rock shaft 40 journaled in the upper end of a frame comprising upright arms 41. Said frame is mounted on a horizontal shaft 42 carried on a bracket 43 on the conveyor frame 11. The frame 41 is adapted to be swung in and out about the axis of the shaft 42 for adjusting the bar 38 along the head 37. Such adjustment is effected by means of an adjusting screw 44 which may have a threaded connection with a head 45 on said frame, the inner end of the screw rod 44 being journaled in the frame 11. The bar 38 is yieldingly held against the head 37 my means of springs 46 which bear upwardly against rock arms 47 which, as shown, are extensions of the arms 39.

The squeegee operating mechanism comprises an endless chain conveyor or carrier 50 which runs on sprockets 51, the latter being mounted on vertical spindles 52 journaled in standards 53 carried by an angle bar 54 supported on the frame 10. Below the carrier 50 is a stationary ink channel or trough 55 which may be supported by means of bracket arms 56 attached to the standards 53. This channel as viewed in plan (Fig. 2) comprises semi-circular ends concentric with the shafts 52 and intermediate straight side portions, one of which is over and parallel with the conveyor 12 and spaced therefrom. This latter straight section extends through the stenciling zone and the bottom thereof is cut away to provide an opening 57 to expose a stencil screen 58 carried by a screen frame 59 removably attached, as by means of clamping bars 60, to the bottom of the inking trough so that the screen covers the opening 57. Said screen may be of conventional construction comprising silk or other porous fabric, with an overlying sheet or coating of impervious material in which is stenciled or cut the lettering or other design with which the bottles are to be decorated.

The bottles 23 are caused to travel in succession beneath and in rolling contact with the screen, as more fully hereinafter set forth, and the marking or coloring material, such as a semi-liquid ink or pigment carried within the inking trough 55, is applied through the stenciled screen to the surface of each bottle as it rolls along the screen. The coloring material is forced through the screen by means of squeegees 61 arranged to travel through the stenciling zone in contact with the screen and directly over the bottles 23 as the latter pass through the stenciling zone in rolling contact with the under surface of the screen. Each squeegee comprises a blade made of rubber composition or the like carried in rock arms 62 fixed to a rock shaft 63 journaled in a bearing block 64. The blocks 64 form links of the chain conveyor 50. The squeegees bear downward against the flat floor of the channel 55 and against the screen with a yielding pressure which may be adjusted by means of weights 65 mounted on rock arms attached to the squeegee shafts, the weights being adjustable lengthwise of the rock arms.

The carriers 20 for the work-pieces are arranged to be supported on rails 66 during their travel through the decorating or stenciling zone. The shafts 21 carry rolls 67 and 68 to run on said rails, the rolls 68 being formed with a flange to run in a corresponding groove in the rails 66, thereby positively guiding the frame 20 and preventing movement thereof in a direction transverse to the line of travel. The rails serve also to lift the work-piece 23 and hold it positively in contact with the screen as it travels therebeneath.

Figure 1:
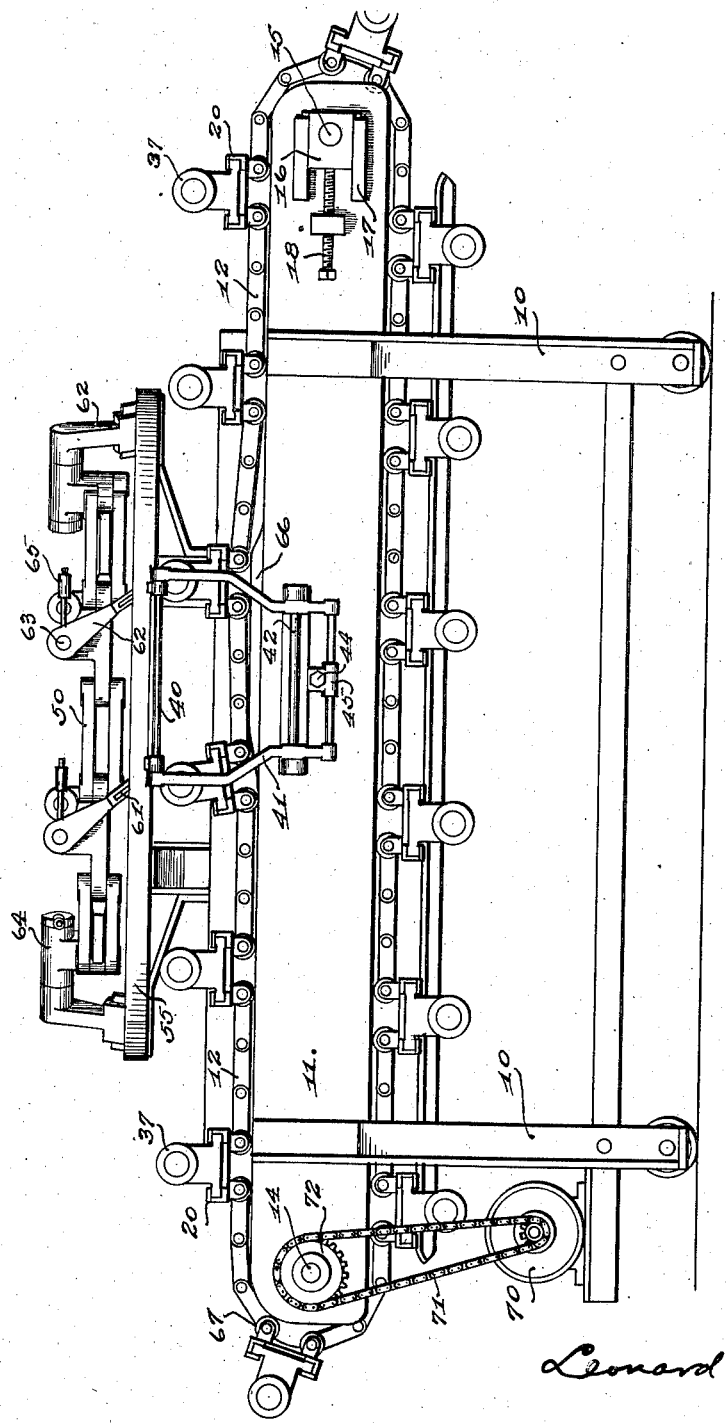
Fig. 1 is a side elevation of a machine constructed in accordance with the principles of the present invention.

The conveyor 12 is driven continuously by an electric motor 70 (Fig. 1) which has a driving connection with the conveyor through a sprocket chain 71 and sprocket wheel 72 on the conveyor drive shaft 14. Motion is transmitted from the shaft 14 to the squeegee chain 50 through intermeshing beveled gears 73 and 74 (Fig. 2). The gear 74 is carried on a shaft journaled in a bearing 75, said shaft connected through differential gearing 76 to drive a shaft 77 (Figs. 2 and 3). A beveled gear 78 on the shaft 77 drives a gear 79 on the lower end of one of the sprocket shafts 52. The squeegee conveyor is driven continuously through the gearing just described, which gearing is arranged and proportioned to drive the two conveyors 12 and 50 in synchronism and with the squeegees traveling through the stenciling zone at the same speed as the bottles or work-pieces therebeneath. The squeegees are also spaced apart the same distance as the carriers 20 for the work-pieces so that as a work-piece or bottle rolls along the screen a squeegee is directly thereover. The differential gearing 76 includes adjusting means by which the conveyor 50 may be adjusted relative to the conveyor 12 for the purpose of bringing the squeegees into exact register with the work-pieces.

The adjusting means for the conveyor 50 (see Figs. 2 and 2—A) includes a hand-wheel 76$^a$ on a worm shaft carrying a worm 76$^b$ which runs in mesh with a gear segment 76$^c$ connected to the housing 76$^d$ in which is journaled the pinion 76$^e$ of the differential gearing. By rotation of the hand-wheel 76$^a$ the housing 76$^d$ and the gear 76$^e$ are adjusted about the axis of the shaft 77. This causes a rotation of the pinion about its own axis and a relative rotation of the gears which mesh therewith, thereby adjusting the position of the squeegee conveyor 50 relative to the conveyor 12.

The engagement of the work-piece 23 with the screen as it passes therebeneath tends to impart rotation to the work-piece, or, in other words, roll it along the screen. This rolling movement is rendered more positive by means of the frictional driving engagement of the bar 38 with the head 37. By adjusting the bar 38 in the manner heretofore described, the speed of rotation imparted thereby to the chuck may be adjusted to correspond with the diameter of the bottle or other cylindrical surface which is being decorated, so that there will be no slipping between the work-piece and the screen.

The operation will be understood from the foregoing description, but may be summarized as follows: The bottle conveyor 12 and the squeegee conveyor 50 are driven continuously and in synchronism by the motor 70 and interconnected gearing. As each work-holder 20 approaches the stenciling zone the operator places a bottle 23 thereon. For this purpose the block 33 carrying the chuck may be pulled lengthwise of the carrier 20 against the tension of a spring 33$^a$ which then serves to return the chuck and hold it in gripping engagement with the bottle. The bottles pass in continuous succession through the stenciling zone and during their passage therethrough are held in rolling contact with the stationary stencil screen 58. As each bottle rolls along the screen a squeegee 61 traveling with the bottle and bearing against the screen operates in the usual manner to apply the pigment or coloring material through the screen onto the surface of the bottle. The bottles after passing through the stenciling zone are removed for further treatment by which the design is made permanent Although the invention as herein disclosed is particularly adapted for decorating bottles, it will be understood that various other articles might be decorated in like manner. Modifications in the construction and arrangement of parts may be resorted to within the spirit and scope of my invention.

What I claim is:

1. Apparatus for decorating the surfaces of articles which comprises, in combination, means for conveying the articles in succession through a decorating zone, a flat screen in said zone, a squeegee, and means for moving the squeegee in a closed path in a plane parallel with the screen and causing the squeegee to register and travel with a said article as the latter travels through the decorating zone.

2. Apparatus for decorating the surfaces of articles, comprising the combination of a flat screen, means for conveying articles serially through a decorating zone with the articles in rolling contact with the screen, a squeegee, and means for causing the squeegee to travel in a closed path parallel with the plane of the screen and causing the squeegee to bear on the screen and travel in register with an article as the latter moves through the decorating zone.

3. Apparatus for decorating the surfaces of articles, comprising the combination of a flat horizontal screen, means for conveying articles serially through a decorating zone with the articles in rolling contact with the under surface of the screen, a squeegee, and means for causing the squeegee to travel continuously in a closed path parallel with the plane of the screen and causing the squeegee to bear on the top surface of the screen and travel in register with an article as the latter moves through the decorating zone.

4. Apparatus for decorating the surfaces of articles, comprising means for conveying articles serially through a decorating zone, an endless channel, said channel formed with a bottom opening extending through the decorating zone, a screen covering said opening, a squeegee, and means for causing the squeegee to travel in a closed path defined by said channel and bear against the screen during its passage through the decorating zone.

5. Apparatus for decorating the surfaces of articles, comprising means for conveying articles serially through a decorating zone, an endless channel, said channel formed with a bottom opening extending through the decorating zone, a screen covering said opening, a series of squeegees, and means for causing them to travel along said channel and pass in succession through said zone in contact with the screen and in register with articles passing through said zone.

6. In apparatus for decorating the surfaces of articles, the combination of an inking trough comprising a horizontally disposed endless channel, a screen comprising a portion of the floor of said channel, a squeegee, and means for moving the squeegee in a closed path defined by said channel and causing it to periodically wipe over the surface of said screen.

7. In apparatus for decorating the surfaces of articles, the combination of an inking trough comprising a horizontally disposed endless channel, a screen comprising a portion of the floor of said channel, an endless carrier, a series of squeegees connected to said carrier, and means for driving said carrier and causing the squeegees to travel along said channel and screen.

8. In apparatus for decorating the surfaces of articles, the combination of an inking trough comprising a horizontally disposed endless channel, a screen comprising a portion of the floor of said channel, an endless carrier, a series of squeegees connected to said carrier, means for driving said carrier and causing the squeegees to travel along said channel and screen, a work-piece conveyor, work-piece holders thereon, and means for driving the work-piece conveyor and causing work-pieces on said holders to travel along said screen in register with the squeegees.

9. The combination of a horizontally traveling conveyor, article holders arranged at intervals along the conveyor and carried thereby in succession through a decorating zone, a horizontally disposed screen in said zone arranged to overlie the articles as they pass through said zone, a squeegee carrier, a series of squeegees connected thereto, and means for driving said conveyor and carrier including interconnected mechanism whereby they are driven in synchronism, said squeegees arranged to travel in succession over said screen and in register with articles traveling therebeneath.

10. The combination of a horizontally traveling conveyor, article holders arranged at intervals along the conveyor and carried thereby in succession through a decorating zone, a horizontally disposed screen in said zone arranged to overlie the articles as they pass through said zone, a squeegee carrier, a series of squeegees connected thereto, means for driving said conveyor and carrier including interconnected mechanism whereby they are driven in synchronism, said squeegees arranged to travel in succession over said screen and in register with articles traveling therebeneath, and adjusting means for adjusting the position of the squeegee carrier relative to said conveyor for bringing the squeegees into register with the articles in said holders.

11. The combination of a horizontally traveling conveyor, article holders arranged at intervals along the conveyor and carried thereby in succession through a decorating zone, a horizontally disposed screen in said zone arranged to overlie the articles as they pass through said zone, a squeegee carrier, a series of squeegees connected thereto, means for driving said conveyor and carrier including interconnected mechanism whereby they are driven in synchronism, said squeegees arranged to travel in succession over said screen and in register with articles traveling therebeneath, means for rotating the articles as they move along the screen, and means for adjusting the angular speed of rotation of the articles.

12. Apparatus for decorating the curved surfaces of articles, comprising a screen, a conveyor, an article holder on said conveyor, means for mounting an article on said holder for rotation about the axis of its said curved surface, means for driving said conveyor and thereby advancing the article bodily, means for causing rotation of the article about said axis with said surface in rolling contact with the screen as the article advances, means coacting with the screen to decorate said surface, and adjusting means for adjusting the speed of rotation to correspond to the radius of curvature of said surface.

13. In apparatus for decorating curved surfaces of articles, the combination of a screen, an article holder by which articles are held for rotation, means for causing a relative movement of said holder and screen with said surface in rolling contact with the screen, means separate from said screen for rotating the article, and means for adjusting the speed of rotation of the article to synchronize the rotative movement of the article with said relative movement of the article holder and screen.

14. Apparatus for decorating the surfaces of articles, comprising a chuck for holding the article, means for rotating the chuck and thereby imparting rotative movement to said article, a screen, means for causing relative movement of the chuck and screen by which the article is caused to advance along the screen, and means for rotating the chuck during said advance, said means comprising a friction head connected to rotate with said chuck and a friction bar bearing against said head.

15. Apparatus for decorating the surfaces of articles, comprising a chuck for holding the article, means for rotating the chuck and thereby imparting rotative movement to said article, a screen, means for causing relative movement of the chuck and screen by which the article is caused to advance along the screen, means for rotating the chuck during said advance, said means comprising a friction head connected to rotate with said chuck, said head having a frusto-conical bearing surface concentric with the axis of rotation of the chuck, a friction bar engaging said frusto-conical surface, the latter having a rolling contact with said bar, and means for adjusting said bar along said surface in a direction transverse to the length of the bar and thereby adjustably varying the angular speed of rotation of the chuck.

16. The combination of an endless conveyor, work-piece holders arranged at intervals along the conveyor, a horizontally disposed screen spaced above said conveyor, means for driving said conveyor and causing work-pieces on said holders to be carried in succession beneath the screen and to roll in contact with the under surface of the screen, squeegees, means for driving the squeegees and causing them to move along the screen in contact with the upper surface thereof and in register with the articles therebeneath, each of said holders comprising a chuck by which the articles are held, and means separate from the screen to rotate the chucks as the articles held thereby advance along the screen.

17. The combination of an endless conveyor, work-piece holders arranged at intervals along the conveyor, a horizontally disposed screen spaced above said conveyor, means for driving said conveyor and causing work-pieces on said holders to be carried in succession beneath the screen and to roll in contact with the under surface of the screen, squeegees, means for driving the squeegees and causing them to move along the screen in contact with the upper surface thereof and in register with the articles therebeneath, each of said holders comprising a chuck by which the articles are held, friction heads connected to said chucks for rotation therewith, and a stationary friction bar extending in a direction parallel with the direction of travel of the chucks and held in engagement with each said head as the article carried by the connected chuck advances along the screen, whereby rotative movement is imparted to said article.

18. Apparatus for decorating the curved surfaces of articles, comprising a screen, a conveyor, an article holder on said conveyor, means for mounting an article on said holder for rotation about the axis of its said curved surface, means for driving said conveyor and thereby advancing the article bodily, means for causing rotation of the article about said axis with said surface in rolling contact with the screen as the article advances, means co-acting with the screen to decorate said surface, adjusting means for adjusting the speed of rotation to correspond to the radius of curvature of said surface and means comprising an element common to all of the holders and devices individual thereto successively engaging said element whereby to secure the holders against movement in a direction transverse to their normal line of travel relative to the screen.

19. Apparatus for decorating the curved surfaces of articles, comprising a screen, a conveyor, an article holder on said conveyor, means for mounting an article on said holder for rotation about the axis of its said curved surface, means for driving said conveyor and thereby advancing the article bodily, means for causing rotation of the article about said axis with said surface in rolling contact with the screen as the article advances, means co-acting with the screen to decorate said surface, adjusting means for adjusting the speed of rotation to correspond to the radius of curvature of said surface and means comprising a stationary grooved rail common to all of the holders and flanged rolls individual to and carried by the holders for engagement with said rail during movement of the holders in contact with the screen whereby to secure said holders against movement in a direction transverse to their normal line of travel relative to the screen.

20. Apparatus for decorating the surfaces of articles which comprises a series of article holders, a stencil screen, a series of squeegees adapted to operate one at a time against that face of the screen opposite the article holders, means for moving the squeegees and article holders in timed relation to each other, and means whereby the relative positions of all of the squeegees and holders may be adjusted simultaneously in the direction of the length of the screen.

21. In apparatus for decorating the curved surfaces of articles, the combination of an endless conveyor operable to bring articles in succession to a decorating zone, a stencil screen in said zone spaced vertically from the conveyor, means separate from the conveyor and cooperating therewith for moving the articles vertically and thereby bringing them one at a time into rolling contact with the screen and a squeegee arranged for contact with that surface of the screen opposite the articles.

22. In apparatus for decorating articles, the combination of an endless series of article holders operable to bring articles in succession to a decorating zone, a stencil screen in said zone spaced vertically from the normal path of travel of the holders, means common to all of and separate from the holders for moving them one at a time vertically and thereby bringing articles carried thereby into rolling contact with the screen and a squeegee arranged for contact with the screen.

23. In apparatus for decorating articles, the combination of an endless conveyor operable to bring articles in succession to a decorating zone, a stationary flat stencil screen in said zone spaced vertically from the conveyor, means separate from the conveyor and cooperating therewith for moving the articles vertically while in said zone and thereby bringing them one at a time into contact with the screen, a squeegee adapted for contact with the screen and means for moving the squeegee in a fashion to force a coloring material through the screen onto the articles.

24. In apparatus for decorating articles, the combination of an endless series of article holders operable to bring articles in succession to a decorating zone, a flat stencil screen in said zone spaced vertically from the holders, means separate from the conveyor and cooperating therewith for moving the articles vertically while in said zone and thereby bringing them one at a time into contact with the screen, a squeegee adapted for contact with the screen and means for effecting relative movement between the squeegee and screen in a fashion to force a coloring material through the latter onto the articles.

25. In an apparatus for decorating articles, the combination of an endless series of article holders operable to bring articles in succession to a decorating zone, a stencil screen in said zone spaced vertically from the normal path of travel of the holders, cam means common to all of and separate from the holders for moving them one at a time vertically and thereby bringing articles carried thereby into rolling contact with the screen and a squeegee arranged for contact with the screen.

LEONARD D. SOUBIER.